US011043037B2

(12) United States Patent
Ebert (10) Patent No.: US 11,043,037 B2
(45) Date of Patent: Jun. 22, 2021

(54) METHOD AND DEVICE TO DETERMINE THE DIMENSIONS AND DISTANCE OF A NUMBER OF OBJECTS IN AN ENVIRONMENT

(71) Applicant: Siemens Healthcare GmbH, Erlangen (DE)

(72) Inventor: Anton Ebert, Nuremberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/807,456

(22) Filed: Mar. 3, 2020

(65) Prior Publication Data

US 2020/0286291 A1    Sep. 10, 2020

(30) Foreign Application Priority Data

Mar. 7, 2019  (EP) ..................... 19161318

(51) Int. Cl.
*G06T 19/00* (2011.01)
*G06T 7/73* (2017.01)
(Continued)

(52) U.S. Cl.
CPC ............. *G06T 19/006* (2013.01); *G06K 9/52* (2013.01); *G06K 9/6215* (2013.01); *G06T 7/593* (2017.01);
(Continued)

(58) Field of Classification Search
CPC ........... G06T 19/006; G06T 7/60; G06T 7/74; G06T 7/593; G06T 2207/30204;
(Continued)

(56) References Cited

U.S. PATENT DOCUMENTS

2014/0161323 A1* 6/2014 Livyatan ............... G06T 3/0093
382/107
2015/0109513 A1* 4/2015 Nayar ............... H04N 5/232125
348/349
(Continued)

FOREIGN PATENT DOCUMENTS

EP    2546806 A2    1/2013
EP    2866197 A2    4/2015

OTHER PUBLICATIONS

Kato H. et al: "Virtual object manipulation on a table-top AR environment", Augmented Reality, 2000. (ISAR 2000). Proceedings. IEEE and ACM International Symposium on Munich, Germany Oct. 5-6, 2000, Jan. 1, 2000 (Jan. 1, 2000), pp. 111-119, XP055336195; US, DOI: 10.1109/ISAR.2000.880934; ISBN: 978-0-7695-0846-7; 2000.
(Continued)

*Primary Examiner* — Xilin Guo
(74) *Attorney, Agent, or Firm* — Harness, Dickey & Pierce. P.L.C.

(57) ABSTRACT

A method to determine the dimensions and distance of a number of objects in an environment includes providing a number of objects including a marking element; recording a visual image-dataset of at least one of the objects with a camera; and determining a parameter value from the image of a marking element in the image-dataset or from a measurement of an additional sensor at the location of the camera. The parameter value is a value depending from the distance of the object to the camera. The method further includes calculating the relative distance between the object and the camera based on the parameter value and calculating dimensions of the object from at least a part of the image of the object in the image-dataset and the calculated distance.

(Continued)

A related device, a related system and a related control unit for a virtual reality system are also disclosed.

30 Claims, 5 Drawing Sheets

(51) Int. Cl.
- *G06T 7/593* (2017.01)
- *H04W 4/80* (2018.01)
- *G06K 9/52* (2006.01)
- *G06K 9/62* (2006.01)
- *G06T 7/60* (2017.01)

(52) U.S. Cl.
CPC .................. *G06T 7/60* (2013.01); *G06T 7/74* (2017.01); *H04W 4/80* (2018.02); *G06K 2209/401* (2013.01); *G06T 2207/30204* (2013.01); *G06T 2207/30244* (2013.01)

(58) Field of Classification Search
CPC ........... G06T 2207/30244; G06T 7/571; G06T 2207/10012; G06T 19/00; G06T 7/73; G06K 9/6215; G06K 9/52; G06K 2209/401; G06K 9/62; H04W 4/80
See application file for complete search history.

(56) References Cited

U.S. PATENT DOCUMENTS

| | | | |
|---|---|---|---|
| 2018/0189532 A1* | 7/2018 | Bataller | G06K 9/3233 |
| 2020/0098131 A1* | 3/2020 | Rivera | G06T 7/62 |
| 2020/0279389 A1* | 9/2020 | McIver | G06T 7/12 |

OTHER PUBLICATIONS

Kato, Hirokazu et al "Marker Tracking and HMD Calibration for a Video-based Augmented Reality Conferencing System" Proceedings 2nd IEEE and ACM International Workshop on Augmented Reality (IWAR'99), Oct. 20-21, 1999 // DOI: 10.1109/IWAR.1999.803809.

European Search Report for European Patent Application No. 19161318.1 dated Jul. 16, 2018.

\* cited by examiner

FIG 2

FIG 5

METHOD AND DEVICE TO DETERMINE THE DIMENSIONS AND DISTANCE OF A NUMBER OF OBJECTS IN AN ENVIRONMENT

PRIORITY STATEMENT

The present application hereby claims priority under 35 U.S.C. § 119 to European patent application number EP 19161318.1 filed Mar. 7, 2019, the entire contents of which are hereby incorporated herein by reference.

FIELD

At least one embodiment of the invention generally pertains to a method and a device to determine the dimensions and distance of a number of objects in an environment, especially for implementing data of the objects in a virtual reality, a system, especially for medical use and a control unit suitable for virtual reality.

BACKGROUND

Virtual reality (VR), i.e. the creation of an artificial environment for a user, has become more and more interesting for various technical and medical fields. One important goal is to integrate real objects and persons in a virtual environment, e.g. as virtual objects or as avatars. To achieve this, a virtual reality unit should have the ability to scan the environment, track objects or persons in this environment and create virtual objects or avatars in the virtual reality at a position equivalent to the reality. Often, a VR-unit has to be trained to achieve this goal.

Up to now, VR trainings are achieved by tracking humans and afterwards mapping in virtual reality. To map also (static) objects in the environment or objects a person interacts with, these objects have to be put in their appropriate positions in VR in a time-consuming way until now. Until today there is no acceptable solution of tracking the objects (e.g. a C-arm of an X-ray system) in a way humans can be tracked to avoid the time-consuming construction of a virtual training. Especially, there is no technical solution without optical tracking using IR-signals implemented until now.

SUMMARY

The inventors have discovered that, for the motion of a user in virtual reality, there always is the risk in running into real objects that are not correctly or not at all shown in VR; and for the ability to use real objects while being in VR, it is a major disadvantage that there only exist tracking suits for recording the movement of a human body but no suitable tracking of objects.

At least one embodiment of the present invention improves known devices and methods to facilitate an improvement in determining the dimensions and distance of a number of objects in an environment, especially for implementing real objects in virtual reality.

Embodiments of the present invention are directed to a method, a device, a system and a control unit.

A method according to at least one embodiment of the invention is directed to determining the dimensions and distance of a number of objects in an environment, the method comprising:

providing a number of objects, each of the number of objects including a marking element, in the environment;

recording a visual image-dataset of at least one of the number of objects with a camera, wherein the recording includes recording at least one of a visual image-dataset with a high dynamic range image and an image with different focus points;

determining a parameter value from the image of a marking element in the image-dataset, wherein a parameter value is a value depending from a distance of an object to the camera;

calculating a relative distance between the object and the camera based on the parameter value determined; and calculating dimensions of the object from at least a part of the image of the object in the image-dataset and the distance calculated, wherein at least one of the distance and dimension of the object is determined by at least slicing an area around a marking element, slices including images recorded with different focal points, observing a depth of at least one of a recorded light field and a sharpness of the image in the slices and calculating image-dimensions of the image of the object based on the depth of at least one of the recorded light field and the sharpness of the image, and determining at least one of the distance and dimension of an object based on dimensions of the marking element and known values of a focusing optic of the camera.

A device according to at least one embodiment of the invention to record a number of objects in an environment, wherein a number of objects is provided with a marking element, comprises:

a camera, designed to record a visual image-dataset in a form of at least one of a high dynamic range image and an image with different focus points of at least one of the objects;

a determination device, designed to determine a parameter value from an image of a marking element in the image-dataset, wherein the parameter value is dependent from a distance of an object to the camera; and a calculation unit designed to calculate a relative distance between the object and the camera based on the parameter value determined, and calculate dimensions of the object from at least a part of the image of the object in the image-dataset and the distance calculated, wherein at least one of the distance and dimension of the object is determined by at least slicing an area around a marking element, slices including images recorded with different focal points, observing a depth of at least one of a recorded light field and a sharpness of the image in the slices and calculating image-dimensions of the image of the object based on the depth of at least one of the recorded light field and the sharpness of the image, and determining at least one of the distance and dimension of an object based on dimensions of the marking element and known values of a focusing optic of the camera.

A system according to at least one embodiment of the invention suitable to record a number of objects in an environment, especially for medical use, comprises a device according to at least one embodiment of the invention and a number of objects, preferably medical objects, particularly preferably medical devices. Each of these objects comprises a marking element.

A control unit according to at least one embodiment of the invention for a virtual reality system comprises a device according to at least one embodiment of the invention.

Some units or modules of the device or the control unit mentioned above can be completely or partially realized as software modules running on a processor of a device or a control unit. A realization largely in the form of software modules can have the advantage that applications already installed on an existing system can be updated, with relatively little effort, to install and run these units of the present application.

At least one embodiment of the invention is also directed to a computer program product with a computer program that is directly loadable into the memory of a device or a control unit of an MRI-system, and which comprises program units to perform the steps of at least one embodiment of the inventive method when the program is executed by the control unit or the device. In addition to the computer program, such a computer program product can also comprise further parts such as documentation and/or additional components, also hardware components such as a hardware key (dongle etc.) to facilitate access to the software.

At least one embodiment of the invention is also directed to a computer readable medium such as a memory stick, a hard-disk or other transportable or permanently-installed carrier can serve to transport and/or to store the executable parts of the computer program product so that these can be read from a processor unit of a control unit or a device. A processor unit can comprise one or more microprocessors or their equivalents.

At least one embodiment of the invention is also directed to a device to record a number of objects in an environment, a number of the objects including a marking element, comprising:

a camera, designed to record a visual image-dataset in a form of at least one of a high dynamic range image and an image with different focus points of at least one of the objects; and at least one processor, configured to
  determine a parameter value from an image of a marking element in the image-dataset, wherein the parameter value is dependent from a distance of an object to the camera;
  calculate a relative distance between the object and the camera based on the parameter value determined, and
  calculate dimensions of the object from at least a part of the image of the object in the image-dataset and the distance calculated,
wherein at least one of the distance and dimension of the object is determined by at least
  slicing an area around a marking element, slices including images recorded with different focal points,
  observing a depth of at least one of a recorded light field and a sharpness of the image in the slices and calculating image-dimensions of the image of the object based on the depth of at least one of the recorded light field and the sharpness of the image, and
  determining at least one of the distance and dimension of an object based on dimensions of the marking element and known values of a focusing optic of the camera.

At least one embodiment of the invention is also directed to a device of an embodiment, further comprising:
  a virtual reality display; and
  a virtual reality calculating unit, designed to create a virtual object having same distance and dimensions as the object of the environment and designed to display virtual objects on the virtual reality display.

At least one embodiment of the invention is also directed to a non-transitory computer program product storing a computer program, directly loadable into a virtual reality system, including program elements for performing the method of an embodiment when the computer program is executed by the virtual reality system.

At least one embodiment of the invention is also directed to a non-transitory computer program product storing a computer program, directly loadable into a device or a control unit, preferably for a virtual reality system, including program elements for performing the method of an embodiment when the computer program is executed by the device or the control unit.

At least one embodiment of the invention is also directed to a non-transitory computer-readable medium storing program elements, readable and executable by a computer unit, to perform the method of an embodiment when the program elements are executed by the computer unit.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

A method according to at least one embodiment of the invention is directed to determining the dimensions and distance of a number of objects in an environment, the method comprising:

Providing a number of objects, each comprising a marking element, in the environment. The marking element should be located in or on the object. A suitable marking element is e.g. a beacon, especially a Bluetooth-Low-Energy (BLE) beacon or a visible QR-code.

Recording a visual image-dataset of at least one of the number of objects with a camera. Such image dataset could comprise a (single) picture, a set of pictures or a set of image data in a picture (e.g. a HDR image with various focal points). The "image-dataset" could also be designated as "image", "photo" or "picture", however, it should be clear that it could comprise the data of one, two or more images taken by the camera (e.g. a stereo-image or an HDR-Image). In the easiest case one single photography could be used.

Determining a parameter value of the marking element from the image-dataset or from the measurement of an additional sensor at the location of the camera, wherein the parameter value is a value depending from the distance between the object and the camera. This parameter value is important for the invention. The requirement that the parameter value is a value depending from the distance between the object and the camera means that the distance between the object and the camera could be directly or indirectly can be derived from this value. For example, the intensity of a signal from a beacon could be used. Also, the image of a marking element in the image-data could be used as value, since the size of the marking element is known and the distance can be derived from this size and a formula of common projection optics.

Calculating the relative distance between the object and the camera based on this parameter value. This relative distance could e.g. be easily calculated from the intensity of a signal from a beacon arranged in or on this object (since the absolute signal power is known or can easily be measured). From the attenuation of the signal over the distance the distance can be derived. Another example using an image of a marking element is described above.

Calculating dimensions of the object from at least a part of the image of the object in the image-dataset and the calculated distance. This could also be achieved by using the image of a marking element. The dimensions of the image of the object could e.g. be determined in units of the size of the marking element and then be transferred to the real dimensions via a reversion of formulae of common projection optics. Another example is the use of above mentioned signal of the beacon and the dimensions of the object in the image data. To calculate the dimensions of the object in real world, also formulae of projection optics can be used. However, there could be the case that the shape of the object is complex (e.g. a X-ray-system). Then a marking element that is arranged on the surface of the object and being seen in the image-data is advantageous, since by the deformation of the image of the marking element (e.g. a rectangular marking element projected as a parallelogram in the image data) could be used to calculate a rotational orientation of the object in the environment relative to the camera.

A device according to at least one embodiment of the invention to record a number of objects in an environment, wherein a number of objects is provided with a marking element, comprises:

A camera designed to record a visual image-dataset of at least one of the objects.

A determination device designed to determine a parameter value from an image of a marking element in the image-dataset or from another source, wherein the parameter value is dependent from the distance between the object and the camera.

A calculation unit designed to calculate the relative distance between the object and the camera based on this parameter value, as well as calculate dimensions of the object from at least a part of the image of the object in the image-dataset and the calculated distance.

A system according to at least one embodiment of the invention suitable to record a number of objects in an environment, especially for medical use, comprises a device according to at least one embodiment of the invention and a number of objects, preferably medical objects, particularly preferably medical devices. Each of these objects comprises a marking element.

A control unit according to at least one embodiment of the invention for a virtual reality system comprises a device according to at least one embodiment of the invention.

Some units or modules of the device or the control unit mentioned above can be completely or partially realized as software modules running on a processor of a device or a control unit. A realization largely in the form of software modules can have the advantage that applications already installed on an existing system can be updated, with relatively little effort, to install and run these units of the present application.

At least one embodiment of the invention is also directed to by a computer program product with a computer program that is directly loadable into the memory of a device or a control unit of an MRI-system, and which comprises program units to perform the steps of at least one embodiment of the inventive method when the program is executed by the control unit or the device. In addition to the computer program, such a computer program product can also comprise further parts such as documentation and/or additional components, also hardware components such as a hardware key (dongle etc.) to facilitate access to the software.

A computer readable medium such as a memory stick, a hard-disk or other transportable or permanently-installed carrier can serve to transport and/or to store the executable parts of the computer program product so that these can be read from a processor unit of a control unit or a device. A processor unit can comprise one or more microprocessors or their equivalents.

Particularly advantageous embodiments and features of the invention are given by the dependent claims, as revealed in the following description. Features of different claim categories may be combined as appropriate to give further embodiments not described herein.

According to a method of at least one embodiment, a number of objects comprise a marking element actively sending electromagnetic signals with a distance-dependent signal shape. The signal could be a Bluetooth signal or another electromagnetic signal with a distance dependent intensity. The dependence of intensity and distance can easily be measured or calculated. The signal of the marking element could be measured with a sensor of the camera or an additional sensor arranged at the location of the camera.

It is preferred that the marking element sends or shows an individual identification code. This is independent of the type of marking element. This could be achieved by printing an individual code or pattern on the marking element or in that the marking element sends a signal with an individual encoding. The information of the marking element, especially its identification, are preferably stored together with the image-dataset.

It is particularly preferred that the signal element is a Bluetooth marker, preferably a Bluetooth low energy tag, also called "BLE-Beacon".

According to a method of at least one embodiment, the relative position of an object in relation to the camera is calculated based on the distance of the object and the position of the object in the image-dataset, wherein preferably also the dimensions of the object are considered in this calculation. Preferably, a coordinate system is assigned to an object at the end of this calculation and/or a relative distance between two objects is derived from this calculation.

According to a method of at least one embodiment, the relative position of the camera in relation to an object is determined via Bluetooth low energy indoor navigation, the principle of Simultaneous Localization and Mapping ("SLAM") or inertial sensors. These sensors could e.g. be found in a smartphone, tablet computer or notebook, wherein the onboard camera of such device is preferably used as camera to take the image-dataset.

According to a method of at least one embodiment, a marking element is a visual marker with a defined dimension and is applied at a surface of an object. There it could be seen by the camera. The determined parameter value needed to calculate the distance is preferably the image of the marker. Then the relative distance between the object and the camera and/or the dimensions of the object are preferably calculated from the image of the marker and the known values of a focusing optics of the camera. It should be noted that the marking elements have to appear on a picture of the image-dataset and their size has to be known. To get a good result in praxis, several marking elements should be applied at different surfaces so that there can be seen at least one marking element from any position in the environment.

According to a method of at least one embodiment, in the course of recording a visual image-dataset, a stereo-image is recorded, wherein a relative distance between an object and the camera is calculated using triangulation based on the stereo-image of the marking element. This allows a fast and accurate determination of the distance and also the orientation of the object in the environment.

According to a method of at least one embodiment, in the course of recording a visual image-dataset, a high dynamic range image and/or an image with different focus points is recorded. This provides image data with a good contrast and a good luminosity.

Preferably, the distance and/or dimension of an object is determined by
  slicing the area around a marking element and/or an object, wherein the slices comprise images recorded with different focal points, wherein in each slice a higher amount of sharp spots are detected as plane/line, and
  observing the depth of the recorded light field and/or the sharpness of the image in the slices and calculating image-dimensions of the image of the object based on the depth of the recorded light field and/or the sharpness of the image, and
  determining the distance and/or dimension of an object based on the image dimensions, preferably the dimensions of the marking element and the known values of a focusing optics of the camera.

The slices are the pictures (of the HDR-dataset) with different focal points. On every picture, there is one sharp plane of the environment and other areas are diffuse. Since the focus "moves" in the image-dataset, there is a series of pictures with different sharp areas. The focal point of the picture, where one surface or edge of an object is pictured sharp is taken as distance, wherein dimensions of the object can be calculated from the set of pictures where other surfaces or edges of the object are sharp. By moving through the images while shifting the focal point, one can scan "along the object". It is also possible to first determine a set of dimensions of the image of the object, then determine the distance to a defined point of the object (e.g. a surface or the center of mass) and then calculate the real dimensions of the object by scaling the set of dimensions depending on the distance.

It should generally be noted that the projection scale S of the camera is well known. Any calculations of sizes in the reality A based on the projection optic from the image size B can be made based on the formula $A=1/S \cdot B$. However, there are more sophisticated formulae concerning all kinds of distortions or imaging errors.

According to a method of at least one embodiment, an object is identified in the image-dataset. Then there could preferably be built a bounding box around the identified object. The size of a marking element is related to the (contour lines of the) bounding box around the object to determine the dimensions of the object. This is preferably achieved by calculating how many times the marker fits in the area of the bounding box.

This bounding box makes it easier to arrange an object in a virtual reality environment.

According to a method of at least one embodiment, there is performed the additional step of creating a virtual object within a virtual reality having the same distance and dimensions as the object. It is preferred to provide an identification mark connected with the virtual object, particularly preferably wherein the identification mark of the virtual object corresponds to an identification code of a marking element of the object. For example, when the marking element of the (real) object sends or shows a certain code, this code could be used as an identification mark for the respective virtual object.

A device of at least one embodiment comprises a virtual reality display, wherein the device comprises a virtual reality calculating unit designed to create a virtual object having the same distance and dimensions as an object of the environment and display virtual objects on the virtual reality display. It is preferred that the housing of the virtual reality display comprises the camera, since then it is guaranteed that the view of the camera corresponds to the viewing direction of the virtual reality display. The same is valid for the distance to an object.

Figure 1:
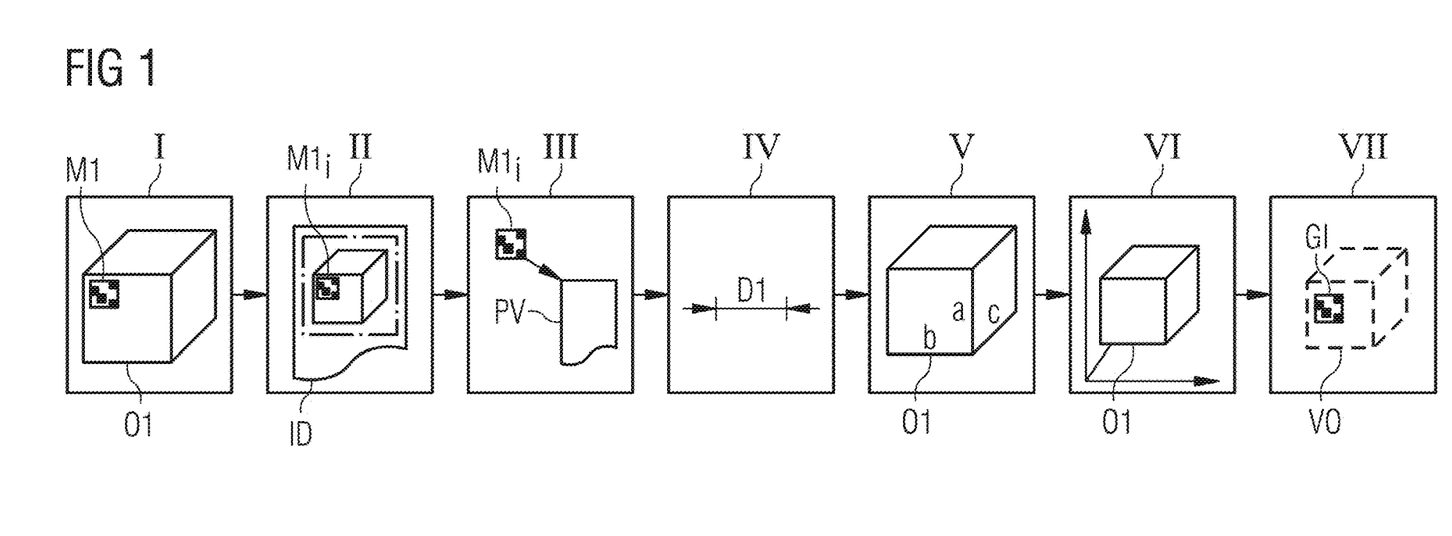
FIG. 1 shows a block diagram of the process flow of a preferred method according to an embodiment of the invention.

FIG. 1 shows a block diagram of the process flow of a preferred method according to the invention. For a possible setup and reference signs, see FIGS. 2 to 4.

In step I, a number of objects O1 is provided in the environment, each comprising a marking element M1. The marking element M1 here could comprise an individual identification code that is indicated with a pattern on the marking element M1. Here, the marking element M1 is a visual marker with a defined dimension and is applied at a surface of the object O1.

In step II, a visual image-dataset ID of the object O1 is recorded with a camera 2 such that an image of the marking element $M1_i$ is visible in the image-dataset ID.

In step III, a parameter value PV based on the marking element M1, here the size of the image of the marking element $M1_i$ in the image-dataset ID, is determined. Also a beacon could be used as marking element M1 and its signal intensity could be measured as parameter value PV. The size of the image of the marking element $M1_i$ depends on the distance between the object O1 and the camera 2.

In step IV, the relative distance D1 between the object O1 and the camera 2 is calculated from the parameter value PV (the size of the image of the marking element $M1_i$), e.g. by using the known size of the marking element M1 and the known distance of the image from the optic of the camera 2 or the focus of the optics of the camera 2.

In step V, the dimensions a, b, c of the object O1 are calculated from at least a part of the image of the object O1 in the image-dataset ID and the calculated distance D1.

In step VI, the relative position of the object O1 in the environment as seen by the camera 2 is calculated based on the calculated distance D1 and the position of the object O1 in the image-dataset ID.

In step VII, a virtual object VO is created within a virtual reality environment having the same distance and dimensions as the object O1 in the virtual reality environment, preferably providing an identification mark GI connected with the virtual object VO, particularly preferably wherein the identification mark GI of the virtual object VO corresponds to the pattern, i.e. the identification code, of the marking element M1 of the object O1. Here it is a virtual marker. Also a label could be applied to the virtual object VO.

Figure 2:
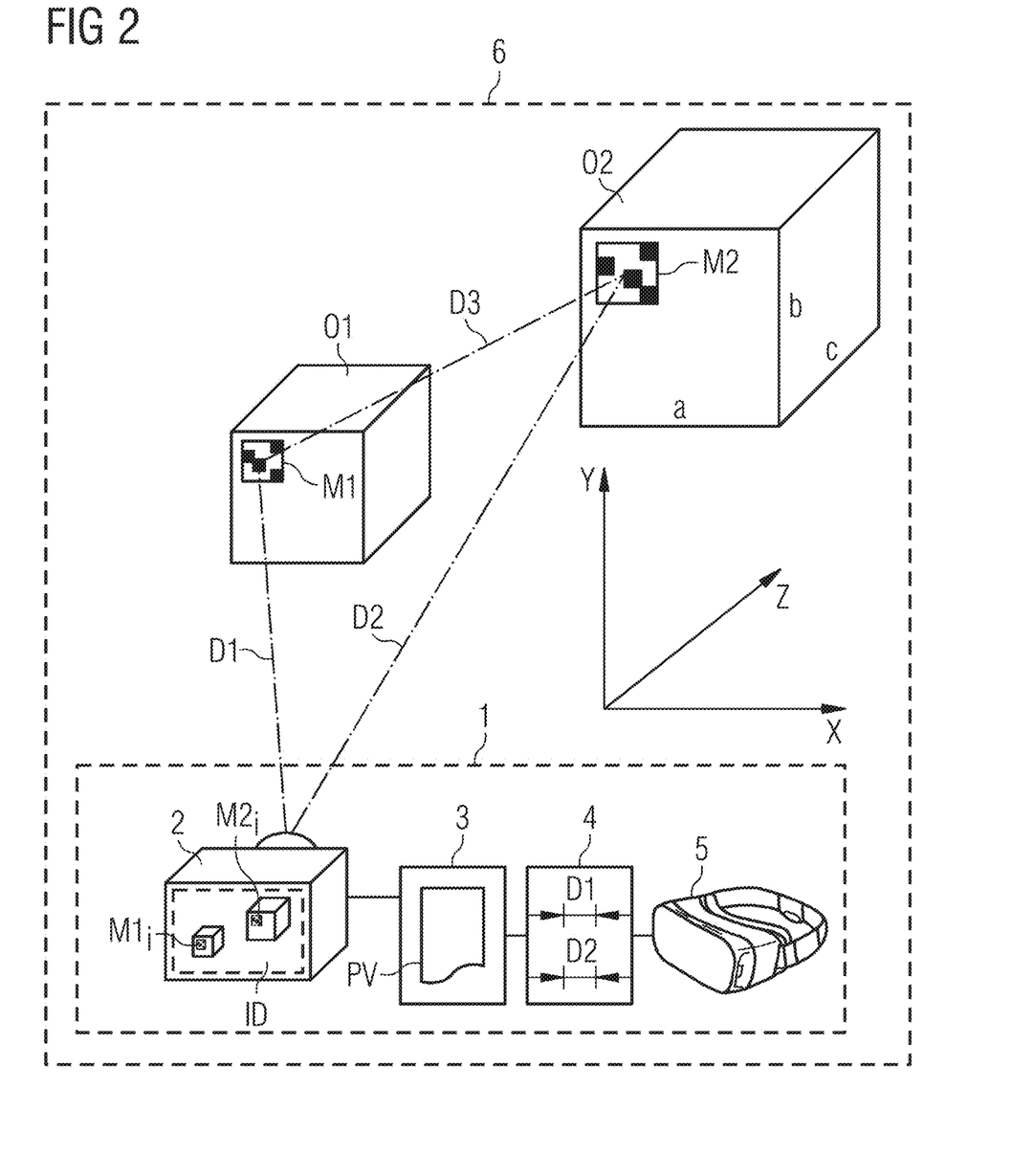
FIG. 2 shows a scheme of an embodiment for an acquisition of an image-dataset, as well as a device of an embodiment and a system of an embodiment.

FIG. 2 shows a preferred scheme for an acquisition of an image-dataset ID as well as a preferred device 1 and a preferred system 6.

The preferred device 1 comprises:
a camera 2 designed to record a visual image-dataset ID of the objects O1, O2 positioned in the environment,
a determination device 3 designed to determine a parameter value PV from images of the marking elements $M1_i$, $M2_i$ of the image-dataset ID. The device could alternatively or additionally comprise a sensor e.g. for measuring the intensity of a Bluetooth signal, and
a calculation unit 4 designed to calculate the relative distances D1, D2 between the objects O1, O2 and the camera 2 based on this parameter value PV, as well as calculate dimensions a, b, c of the objects O1, O2 from at least a part of the image of the objects O1, O2 in the image-dataset ID and the calculated distances D1, D2.

The device also comprises a virtual reality display 5, here a head-up display 5, to display virtual objects VO (see e.g. FIG. 1) for a user in a virtual reality environment.

The shown device 1 together with the virtual reality display 5 could serve as control unit according to an embodiment of the invention.

The preferred system 6 comprises the device 1 and the number of objects O1, O2 each comprising a marking element M1, M2.

Two objects O1, O2 are recorded with the camera 2. The method as described above and shown in FIG. 1 is applied, wherein the distances D1, D2 between the objects O1, O2 and the camera 2 are calculated as well as the dimensions a, b, c of the objects O1, O2 and the positions of the objects O1, O2 relative to a coordinate system X, Y, Z. This coordinate system X, Y, Z could be originate anywhere in the environment. In addition, the relative distance D3 between the objects O1, O2 is derived from these calculations.

Concerning the distances D1, D2, they here are shown as the distances D1, D2 between camera 2 and the marking elements M1, M2. This is not necessary. In general, any point of an object O1, O2 can serve as origin for the calculation of a distance D1, D2. However, since the marking elements M1, M2 are important features of the objects O1, O2, it is preferred to define them as origin.

Figure 3:
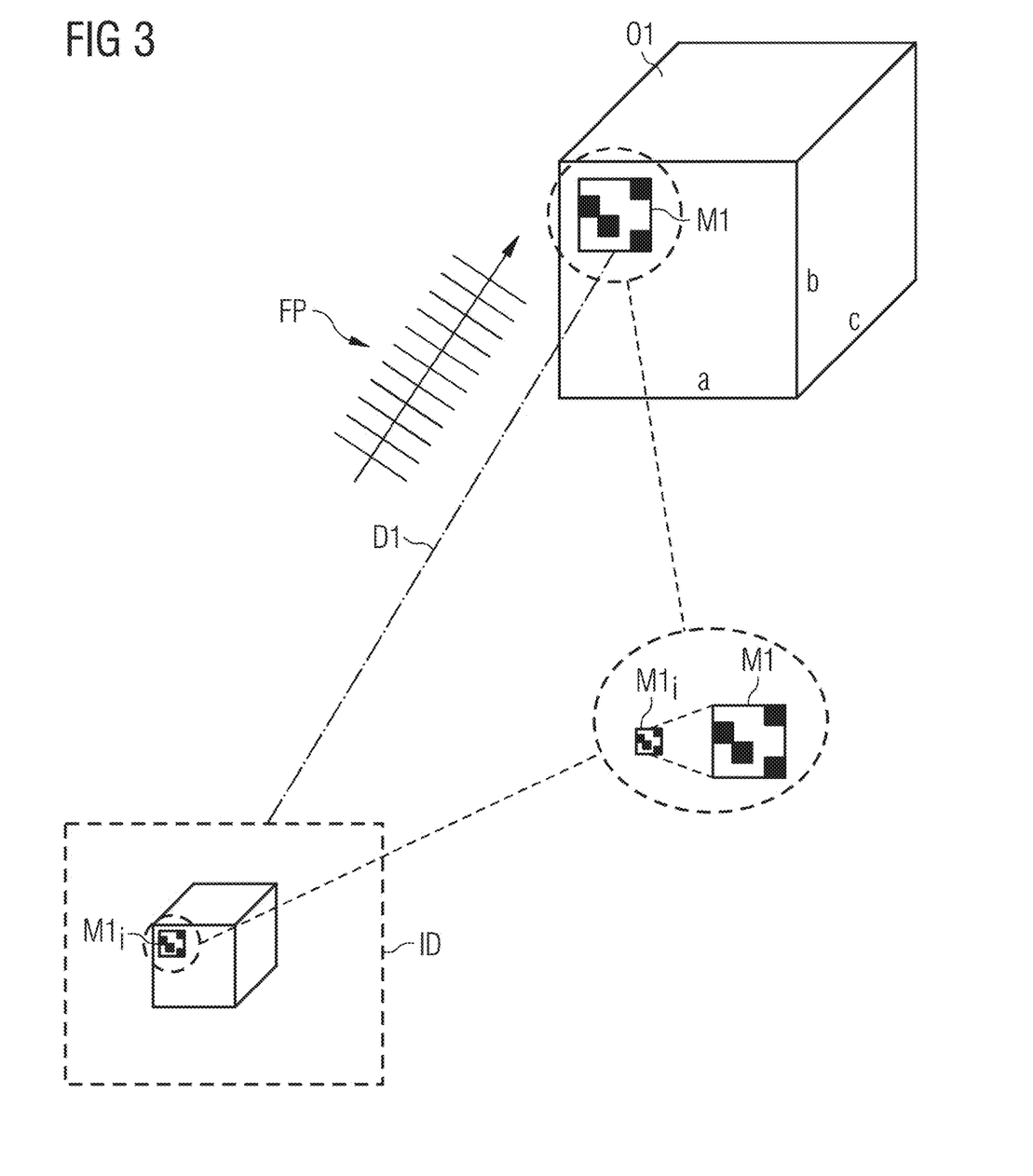
FIG. 3 shows another scheme of an embodiment for an acquisition of an image-dataset.

FIG. 3 shows another preferred scheme for an acquisition of an image-dataset ID. Here a high dynamic range image (HDR-image) with a series of focal points FP is recorded as image-dataset ID. By identifying sharp areas of the object O1 in the different images of the image-dataset ID (at different focal points FP), the distance D1 and dimensions a, b, c of the object O1 can be calculated. Here, also the ratio of the sizes of the marking element M1 and the image of the marking element $M1_i$ (see dashed ellipse) is used to calculate the dimensions a, b, c.

The calculation is preferably achieved by slicing the area around a marking element M1 and/or the object O1, wherein the slices comprise images recorded with different focal points FP, wherein in each slice a higher amount of sharp spots are detected as plane/line. After that the depth of the recorded light field and/or the sharpness of the image is observed in the slices and image-dimensions of the image of the object O1 are calculated based on the depth of the recorded light field and/or the sharpness of the image. Last, the distance D1 and/or dimension a, b, c of the object O1 is determined based on the image dimensions, preferably the dimensions of the marking element M1 and the known values of a focusing optics of the camera 2.

Figure 4:
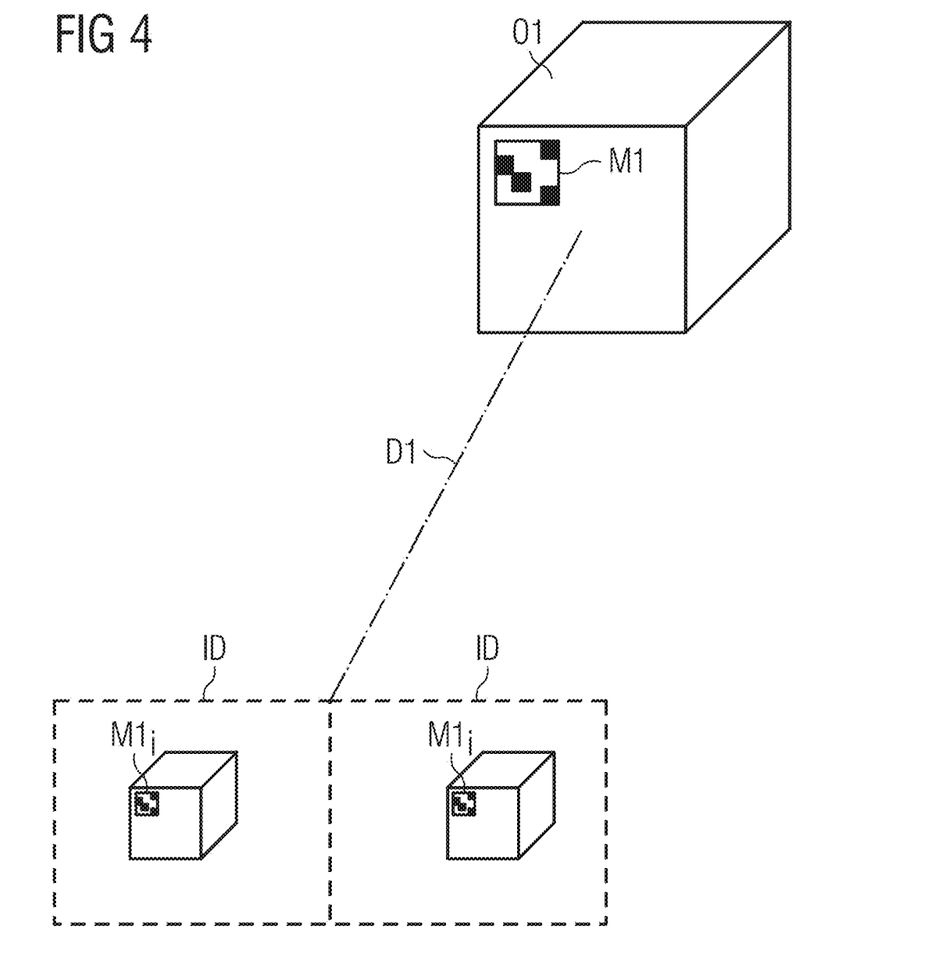
FIG. 4 shows another scheme of an embodiment for an acquisition of an image-dataset.

FIG. 4 shows another preferred scheme for an acquisition of an image-dataset ID. Here in the course of recording a visual image-dataset ID, a stereo-image is recorded, wherein a relative distance D1 between an object O1 and the camera 2 is calculated using triangulation based on the (stereo-) image of the marking element $M1_i$.

Figure 5:
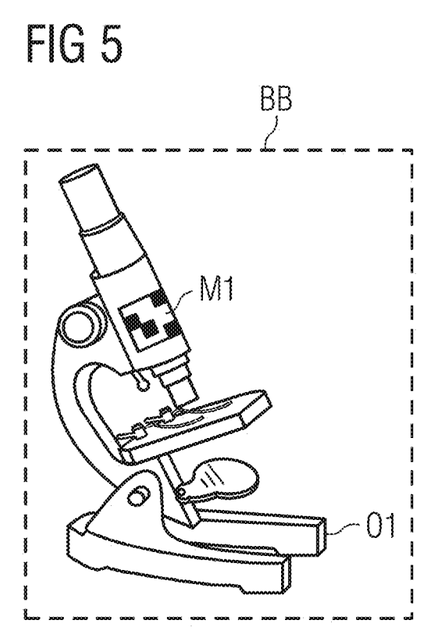
FIG. 5 shows an object with a bounding box.

FIG. 5 shows an object O1 with a bounding box BB. This object O1 (here a microscope) has a very complex shape. To simplify the arrangement of the object in a virtual reality environment, this bounding box BB could be used. The bounding box BB could be designed by identifying the object O1 in the image-dataset ID and building a bounding box BB around the identified object.

The following clauses are also part of the disclosure:

Clause 1: A method to determine the dimensions a, b, c and distance D1, D2 of a number of objects O1, O2 in an environment comprising the steps:
providing a number of objects O1, O2, each comprising a marking element M1, M2, in the environment,
recording a visual image-dataset ID of at least one of the number of objects O1, O2 with a camera 2,
determining a parameter value V from the image of a marking element M1i, M2i in the image-dataset ID or from a measurement of an additional sensor at the location of the camera 2, wherein the parameter value PV is a value depending from the distance D1, D2 of the object O1, O2 to the camera 2,
calculating the relative distance between the object O1, O2 and the camera 2 based on this parameter value PV,
calculating dimensions a, b, c of the object O1, O2 from at least a part of the image of the object O1, O2 in the image-dataset ID and the calculated distance D1, D2.

Clause 2: The method according to clause 1, wherein the relative position of an object O1, O2 in relation to the camera is calculated based on the distance D1, D2 of the object and the position of the object in the image-dataset ID, wherein preferably also the dimensions a, b, c of the object O1, O2 are considered in this calculation.

Clause 3: The method according to one of the preceding clauses, wherein a number of objects O1, O2 comprise a marking element M1, M2, preferably a Bluetooth low energy tag, actively sending electromagnetic signals with a distance-dependent signal shape,
wherein the marking element M1, M2 preferably sends and/or shows an individual identification code, Clause 4: The method according to one of the preceding clauses, wherein the relative position of the camera 2 in relation to an object O1, O2 is determined via Bluetooth low energy indoor navigation, Simultaneous Localization and Mapping or inertial sensors.

Clause 5: The method according to one of the preceding clauses, wherein a marking element M1, M2 is a visual marker with a defined dimension and is applied at a surface of an object O1, O2, wherein the determined parameter value V is the image of the marking element M1, M2 and wherein the relative distance D1, D2 between the object O1, O2 and the camera 2 and/or the dimensions a, b, c of the object O1, O2 are calculated from the image of the marker M1i, M2i and the known values of a focusing optics of the camera 2.

Clause 6: The method according to one of the preceding clauses, wherein in the course of recording a visual image-dataset ID, a stereo-image is recorded, wherein a relative distance D1, D2 between an object O1, O2 and the camera 2 is calculated using triangulation based on the stereo-image of the marking element M1i, M2i.

Clause 7: The method according to one of the preceding clauses, wherein in the course of recording a visual image-dataset ID, a high dynamic range image and/or an image with different focus points is recorded, wherein the distance D1, D2 and/or dimension a, b, c of an object O1, O2 is preferably determined by
slicing the area around a marking element M1, M2 and/or an object O1, O2, wherein the slices comprise images recorded with different focal points FP, wherein in each slice a higher amount of sharp spots are detected as plane/line,
observing the depth of the recorded light field and/or the sharpness of the image in the slices and calculating image-dimensions of the image of the object O1, O2 based on the depth of the recorded light field and/or the sharpness of the image, and
determining the distance D1, D2 and/or dimension a, b, c of an object O1, O2 based on the image dimensions, preferably the dimensions of the marking element M1, M2 and the known values of a focusing optic of the camera 2.

Clause 8: The method according to one of the preceding clauses, wherein an object O1, O2 is identified in the image-dataset ID, wherein preferably a bounding box BB is built around the identified object O1, O2 and the size of a marking element M1, M2 is related to the bounding box BB around the object O1, O2 to determine the dimensions a, b, c of the object O1, O2, preferably by calculating how many times the marking element M1, M2 fits in the area of the bounding box BB.

Clause 9: The method according to one of the preceding clauses, comprising the additional step:
creating a virtual object within a virtual reality having the same distance and dimensions as the object O1, O2, preferably providing an identification mark connected with the virtual object, particularly preferably wherein the identification mark of the virtual object corresponds to an identification code of a marking element M1, M2 of the object O1, O2.

Clause 10: A device to record a number of objects O1, O2 in an environment, wherein a number of objects O1, O2 is provided with a marking element M1, M2, comprising:
a camera 2 designed to record a visual image-dataset ID of at least one of the objects O1, O2,
a determination device 3 designed to determine a parameter value from an image of a marking element M1i, M2i in the image-dataset ID or from another source, wherein the parameter value V is dependent from the distance D1, D2 of the object O1, O2 to the camera 2,
a calculation unit 4 designed to
a) calculate the relative distance D1, D2 between the object O1, O2 and the camera 2 based on this parameter value V,
b) calculate dimensions a, b, c of the object O1, O2 from at least a part of the image of the object O1, O2 in the image-dataset ID and the calculated distance D1, D2.

Clause 11: The device 1 according to clause 10, comprising a virtual reality display 5, wherein the device 1 comprises a virtual reality calculating unit designed to create a virtual object having the same distance and dimensions as an object O1, O2 of the environment and display virtual objects on the virtual reality display 5.

Clause 12: A system, to record a number of objects O1, O2 in an environment, comprising a device 1 according to clause 10 or 11 and a number of objects O1, O2, preferably medical objects, particularly preferably medical devices, each comprising a marking element M1, M2.

Clause 13: A control unit for a virtual reality system comprising a device 1 according to clause 10 or 11.

Clause 14: A computer program product comprising a computer program that is directly loadable into a device 1 or a control unit, preferably for a virtual reality system, which comprises program elements for performing steps of the method according to any of clauses 1 to 9 when the computer program is executed by the device 1 or the control unit.

Clause 15: A computer-readable medium on which is stored program elements that can be read and executed by a computer unit in order to perform steps of the method according to any of clauses 1 to 9 when the program elements are executed by the computer unit.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method to determine dimensions and distance of a number of objects in an environment, the method comprising:
   providing a number of objects, each of the number of objects including a marking element, in the environment;
   recording a visual image-dataset of at least one of the number of objects with a camera, wherein the recording includes recording at least one of a visual image-dataset with a high dynamic range image and an image with different focus points;
   determining a parameter value from the image of a marking element in the image-dataset, wherein a parameter value is a value depending from a distance of an object to the camera;
   calculating a relative distance between the object and the camera based on the parameter value determined; and
   calculating dimensions of the object from at least a part of the image of the object in the image-dataset and the distance calculated,
   wherein at least one of the distance and dimension of the object is determined by at least
      slicing an area around a marking element, slices including images recorded with different focal points,
      observing a depth of at least one of a recorded light field and a sharpness of the image in the slices and calculating image-dimensions of the image of the object based on the depth of at least one of the recorded light field and the sharpness of the image, and
      determining at least one of the relative distance and dimensions of an object based on dimensions of the marking element and known values of a focusing optic of the camera.

2. The method of claim 1, wherein the determining of at least one of the relative distance and dimension of the object includes determining the distance of the object, and wherein a relative position of the object in relation to the camera is calculated based on the relative distance of the object and the position of the object in the image-dataset.

3. The method of claim 1, wherein a signal of the marking element is measured with a sensor of the camera or an additional sensor arranged at a location of the camera.

4. The method of claim 1, wherein a relative position of the camera in relation to an object is determined via Bluetooth low energy indoor navigation, Simultaneous Localization and Mapping or inertial sensors.

5. The method of claim 1, wherein a number of objects include a marking element, the marking element being a visual marker with a defined dimension, the marking element being applied at a surface of an object, wherein the determined parameter value is the image of the marking element and wherein at least one of the relative distance between the object and the camera and the dimensions of the object are calculated from the image of the marker and the known values of a focusing optics of the camera.

6. The method of claim 1, wherein the recording of the visual image-dataset includes recording a stereo-image, wherein the relative distance between the object and the camera is calculated using triangulation based on the stereo-image of the marking element.

7. The method of claim 1, wherein the recording of the visual image-dataset includes recording at least one of a high dynamic range image and an image with different focus points, wherein the at least one of the relative distance and dimension of the object is determined by
   slicing an area around an object, slices resulting from the slicing including images recorded with different focal points, wherein in each slice of the slices, a relatively higher amount of sharp spots are detected as plane/line,
   observing at least one of a depth of recorded light field and a sharpness of the image in the slices and calculating image-dimensions of the image of the object based on at least one of the depth of the recorded light field and the sharpness of the image, and
   determining at least one of the relative distance and dimension of the object based on the dimensions of the marking element and known values of a focusing optic of the camera.

8. The method of claim 1, wherein the object is identified in the image-dataset.

9. The method of claim 1, further comprising:
   creating a virtual object within a virtual reality having a same distance and dimensions as the object.

10. A non-transitory computer program product storing a computer program, directly loadable into a device or a control unit, including program elements for performing the method of claim 1 when the computer program is executed by the device or the control unit.

11. A non-transitory computer-readable medium storing program elements, readable and executable by a computer unit, to perform the method of claim 1 when the program elements are executed by the computer unit.

12. The method of claim 2, wherein the determining of at least one of the relative distance and dimension of the object includes determining the dimensions of the object, and wherein the dimensions of the object are also considered in calculation of the relative position of the object in relation to the camera.

13. The method of claim 3, wherein a number of objects include a Bluetooth low energy tag as the marking element, to actively send electromagnetic signals with a distance-dependent signal shape.

14. The method of claim 13, wherein the marking element at least one of sends and shows an individual identification code.

15. The method of claim 2, wherein a number of objects include a marking element, and wherein a signal of the marking element is measured with a sensor of the camera or an additional sensor arranged at a location of the camera.

16. The method of claim 2, wherein the recording of the visual image-dataset includes recording a stereo-image, wherein the relative distance between the object and the camera is calculated using triangulation based on the stereo-image of the marking element.

17. The method of claim 2, wherein the recording of the visual image-dataset includes recording at least one of a high dynamic range image and an image with different focus points, wherein the at least one of the relative distance and dimension of the object is determined by
slicing an area around an object, slices resulting from the slicing including images recorded with different focal points, wherein in each slice of the slices, a relatively higher amount of sharp spots are detected as plane/line,
observing at least one of a depth of recorded light field and a sharpness of the image in the slices and calculating image-dimensions of the image of the object based on at least one of the depth of the recorded light field and the sharpness of the image, and
determining at least one of the relative distance and dimension of the object based on the dimensions of the marking element and known values of a focusing optic of the camera.

18. The method of claim 8, wherein a bounding box is built around the object identified and a size of the marking element is related to the bounding box around the object to determine the dimensions of the object.

19. The method of claim 18, wherein determining of the dimensions of the object includes calculating how many times the marking element fits in an area of the bounding box.

20. The method of claim 9, wherein the creating includes providing an identification mark connected with the virtual object.

21. The method of claim 20, wherein the identification mark of the virtual object corresponds to an identification code of a marking element of the object.

22. A non-transitory computer program product storing a computer program, directly loadable into a virtual reality system, including program elements for performing the method of claim 1 when the computer program is executed by the virtual reality system.

23. A device to record a number of objects in an environment, a number of the objects including a marking element, comprising:
a camera, designed to record a visual image-dataset in a form of at least one of a high dynamic range image and an image with different focus points of at least one of the objects;
a determination device, designed to determine a parameter value from an image of a marking element in the image-dataset, wherein the parameter value is dependent from a distance of an object to the camera; and
a calculation unit designed to
calculate a relative distance between the object and the camera based on the parameter value determined, and
calculate dimensions of the object from at least a part of the image of the object in the image-dataset and the distance calculated,
wherein at least one of the distance and dimension of the object is determined by at least
slicing an area around a marking element, slices including images recorded with different focal points,
observing a depth of at least one of a recorded light field and a sharpness of the image in the slices and calculating image-dimensions of the image of the object based on the depth of at least one of the recorded light field and the sharpness of the image, and
determining at least one of the distance and dimension of an object based on dimensions of the marking element and known values of a focusing optic of the camera.

24. The device of claim 23, further comprising:
a virtual reality display; and
a virtual reality calculating unit, designed to create a virtual object having same distance and dimensions as the object of the environment and designed to display virtual objects on the virtual reality display.

25. A system, to record a number of objects in an environment, comprising the device of claim 23 and a number of objects, each including a marking element.

26. A control unit for a virtual reality system comprising the device of claim 24.

27. A device to record a number of objects in an environment, a number of the objects including a marking element, comprising:
a camera, designed to record a visual image-dataset in a form of at least one of a high dynamic range image and an image with different focus points of at least one of the objects; and
at least one processor, configured to
determine a parameter value from an image of a marking element in the image-dataset, wherein the parameter value is dependent from a distance of an object to the camera;
calculate a relative distance between the object and the camera based on the parameter value determined, and
calculate dimensions of the object from at least a part of the image of the object in the image-dataset and the distance calculated,
wherein at least one of the distance and dimension of the object is determined by at least slicing an area around a marking element, slices including images recorded with different focal points, observing a depth of at least one of a recorded light field and a sharpness of the image in the slices and calculating image-dimensions of the image of the object based on the depth of at least one of the recorded light field and the sharpness of the image, and determining at least one of the distance and dimension of an object based on dimensions of the marking element and known values of a focusing optic of the camera.

28. The device of claim 27, further comprising:

a virtual reality display; and a virtual reality calculating unit, designed to create a virtual object having same distance and dimensions as the object of the environment and designed to display virtual objects on the virtual reality display.

29. A system, to record a number of objects in an environment, comprising the device of claim 27 and a number of objects, each including a marking element.

30. A control unit for a virtual reality system comprising the device of claim 28.

* * * * *